US009319813B2

(12) United States Patent
Edgar

(10) Patent No.: US 9,319,813 B2
(45) Date of Patent: Apr. 19, 2016

(54) FITTING SYSTEM WITH INTELLIGENT VISUAL TOOLS

(75) Inventor: Daniel Mark Edgar, Lakeville, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 993 days.

(21) Appl. No.: 12/750,216

(22) Filed: Mar. 30, 2010

(65) Prior Publication Data

US 2010/0271373 A1 Oct. 28, 2010

Related U.S. Application Data

(60) Provisional application No. 61/165,495, filed on Mar. 31, 2009.

(51) Int. Cl.
*G06T 11/20* (2006.01)
*H04R 25/00* (2006.01)

(52) U.S. Cl.
CPC ...................................... *H04R 25/70* (2013.01)

(58) Field of Classification Search
None
See application file for complete search history.

(56) References Cited

U.S. PATENT DOCUMENTS

| | | | | |
|---|---|---|---|---|
| 5,835,611 | A * | 11/1998 | Kaiser et al. | 381/321 |
| 6,366,863 | B1 | 4/2002 | Bye et al. | |
| 6,424,722 | B1 | 7/2002 | Hagen et al. | |
| 7,039,876 | B2 * | 5/2006 | Lavendel et al. | 715/777 |
| 7,672,468 | B2 * | 3/2010 | Kaiser et al. | 381/314 |
| 7,715,780 | B1 * | 5/2010 | Beamish et al. | 455/2.01 |
| 2002/0044148 | A1 * | 4/2002 | Ludi | 345/440 |
| 2004/0004617 | A1 * | 1/2004 | Street et al. | 345/440 |
| 2004/0179025 | A1 * | 9/2004 | Samra et al. | 345/629 |
| 2004/0227738 | A1 * | 11/2004 | Sudoh | 345/173 |
| 2005/0180330 | A1 * | 8/2005 | Shapiro | 370/241 |
| 2005/0206644 | A1 * | 9/2005 | Kincaid | 345/440 |
| 2006/0241949 | A1 * | 10/2006 | Tobias et al. | 705/1 |
| 2007/0016449 | A1 * | 1/2007 | Cohen et al. | 705/3 |
| 2007/0168877 | A1 * | 7/2007 | Jain et al. | 715/772 |
| 2007/0186187 | A1 * | 8/2007 | Strope | G06F 3/0481 715/833 |
| 2008/0062177 | A1 * | 3/2008 | Gaul et al. | 345/440 |
| 2008/0168376 | A1 * | 7/2008 | Tien | G06Q 10/10 715/772 |
| 2008/0191118 | A1 * | 8/2008 | Johnson et al. | 248/638 |
| 2008/0250320 | A1 * | 10/2008 | Channell et al. | 715/716 |
| 2009/0028351 | A1 * | 1/2009 | Andersen | 381/60 |
| 2009/0113295 | A1 * | 4/2009 | Halpern et al. | 715/273 |
| 2009/0217150 | A1 * | 8/2009 | Lin | 715/232 |
| 2014/0032616 | A1 * | 1/2014 | Nack | 707/805 |

FOREIGN PATENT DOCUMENTS

| | | | | |
|---|---|---|---|---|
| WO | WO 90/09760 | * | 9/1990 | A61B 5/12 |

OTHER PUBLICATIONS

Macrae et al., "Gain, frequency response, and maximum output requirements for hearing aids," Oct. 1996, National Acoustic Laboratories, Journal of Rehabilitation Research and Development vol. 33 No. 4, p. 364.*

* cited by examiner

*Primary Examiner* — Andrew G Yang
(74) *Attorney, Agent, or Firm* — Schwegman Lundberg & Woessner, P.A.

(57) ABSTRACT

A fitting system with intelligent visual tools may included calculating a response curve of a hearing assistance device, wherein the response curve indicating sound level pressure level compared to frequency. Additionally it may include, displaying, on a display device, the response curve and displaying concurrently with the response curve, a visual cue, wherein the visual cue represents data including at least one of: gain of the response curve, a comparison between a target response curve and the response curve, and a comparison between binaural response curve.

20 Claims, 4 Drawing Sheets

FITTING SYSTEM WITH INTELLIGENT VISUAL TOOLS

CLAIM OF PRIORITY

The present application claims the benefit under 35 U.S.C. 119(*e*) of U.S. Provisional Patent Application Ser. No. 61/165,495, filed on Mar. 31, 2009, which is incorporated herein by reference in its entirety.

FIELD OF THE INVENTION

The present application relates to methods and apparatus for fitting hearing assistance devices, such as hearing aids.

BACKGROUND

Fitting systems for hearing assistance devices, such as hearing aids, typically display curves representing different sound levels and a variety of screens for an audiologist to fit the hearing assistance device to a particular wearer. There is a need in the art for better displays to display a richer set of information to the audiologist. Such systems should provide tools to prevent the audiologist from having to switch between many screens and to clearly depict comparisons of data for ease of fitting a device.

BRIEF DESCRIPTION OF THE DRAWINGS

Some embodiments are illustrated by way of example and not limitation in the figures of the accompanying drawings in which.

DETAILED DESCRIPTION

Figure 1:
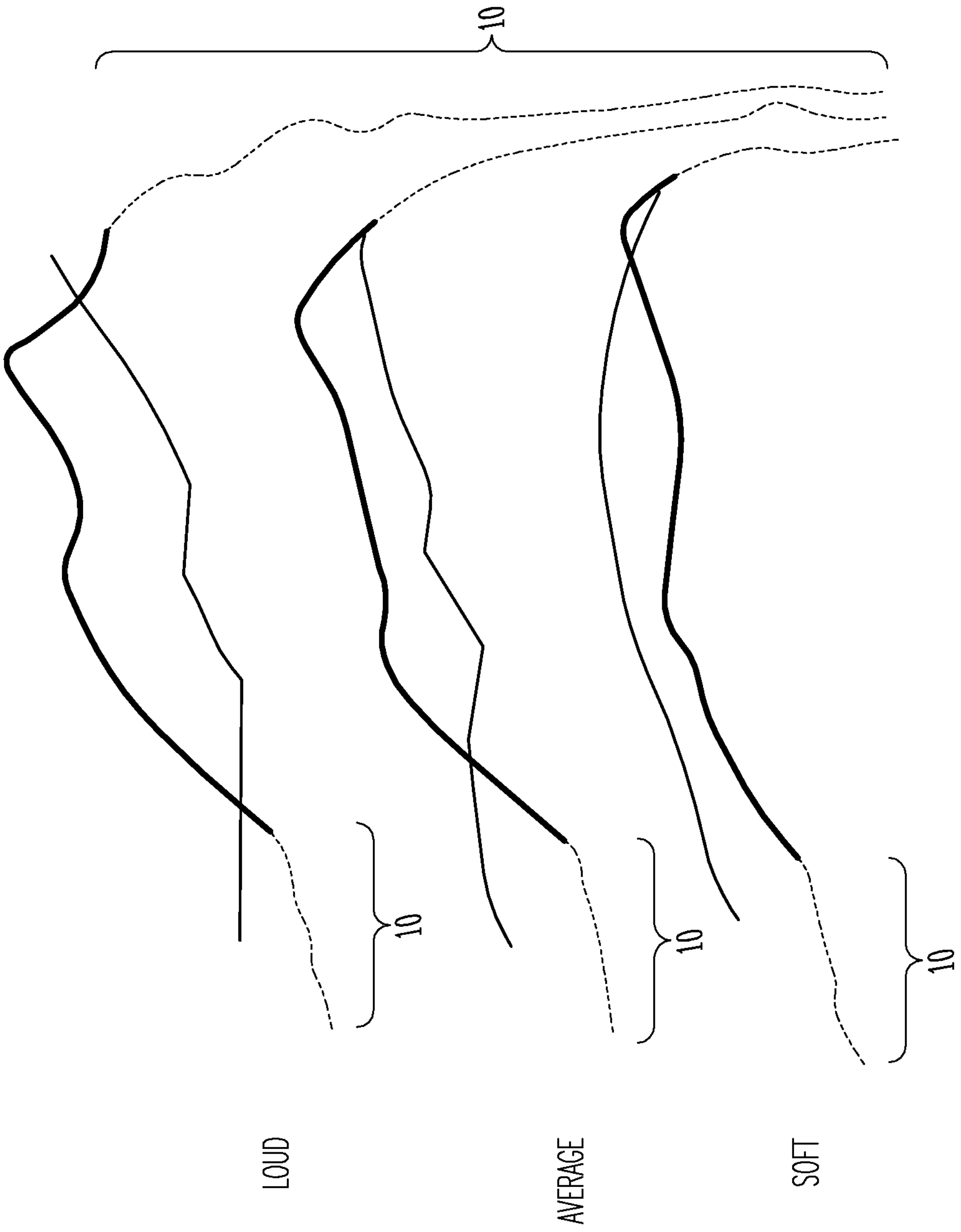
FIG. 1 is an example response graph with a fade out, according to an example embodiment.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter relates to methods and apparatus for fitting hearing assistance devices. Embodiments are provided which may assist an audiologist to use software on a fitting system to better visualize the response of a hearing assistance device, such as a hearing aid.

Indicating Gain on Response Graph

In one embodiment, use of color change is provided to assist a user of a fitting system to indicate gain on the same graph as the response. During a hearing fitting an audiologist will use software to visualize the response of the hearing aid. This response typically consists of 3 curves representing sound level (Loud [90 dB], Average [70 dB], Soft [50 dB]) plotted on an X-Y axis. The X axis is the frequency of the sound, and the Y axis indicates the dB SPL. From this graph an audiologist gets answers to questions such as "What is the performance of the hearing aid when 90 dB SPL [Loud] sound enters the hearing aid at 500 Hz?".

Current fitting systems do not provide the end user, such as the audiologist or other person, cues to indicate gain on the same graph as the response. The present subject matter, among other things, provides a series of cues through color changing techniques as to exactly how the response and gain are related.

A color change is provided to indicate gain on the same graph as the response. In various embodiments, the color change includes a fade out 10 (depicted as a dotted line on FIG. 1) of the response curve region that dips below 0 dB of gain that moves dynamically as the hearing aid response is modified. Thus, the present system allows for a curve to fade out 10 at certain frequencies as gain dips below 0 dB. Other gain values and other curve changes are possible without departing from the scope of the present subject matter. It is understood that other techniques, such as animation and color change can be used to improve the readability of hearing aid response and target graphs.

The present approach allows a user to visualize where gain values transition through a threshold, such as 0 dB, without the need to switch to a different view of the model response. The present approach improves the education of the listener as to the gain behavior for certain adjustments. The present approach also does not require entire graph swaps, or other harsh transitions, when major variables are changed. This present approach engages the user and provides more clarity of how adjustments affect the operation of the hearing assistance device being fitted and it increases the number of dimensions that can be visualized at one time by a user of the system.

FIG. 1 shows an example of a fade out 10 (depicted as dotted lines) of the response curve region that dips below 0 dB of gain. In various embodiments, the faded out region moves dynamically as hearing aid response is modified.

Use of Animation to Highlight Aspects of Model Curves

During a hearing fitting an audiologist will use software to visualize the response of the hearing aid. This response typically consists of 3 curves representing sound level (Loud [90 dB], Average [70 dB], Soft [50 dB]) plotted on an X-Y axis. The X axis is the frequency of the sound, and the Y axis indicates the dB SPL. From this graph an audiologist gets answers to questions such as "What is the performance of the hearing aid when 90 dB SPL [Loud] sound enters the hearing aid at 500 Hz?" At the same time 3 curves representing a target for the response can also exist on the same graph.

During fitting system operations the target for the response can change depending on variables of the fitting. For example: If the patient birth date is updated, the target for the response will be updated.

The targets represent a prescription that is encapsulated in something called a fitting formula. A fitting formula can be thought of as a prescription for a hearing loss. Just as in the prescription drug realm, what works for one person, may not work for another. So there are multiple fitting formulas these include NAL-NL1, DSL [i/o] and others. Fitting formulas can be changed during a fitting leading to a prescription and response change in the fitting system.

Current fitting systems give the end user no cues to indicate changes to the response or target shape on the graph when variables are changed in a fitting.

The present approach provides a series of cues through animation techniques as to exactly how the response and targets change when major fitting variables (i.e., patient birth-date, fitting formula) change during the course of a hearing aid fitting process being administered by an audiologist.

In various embodiments, the curve animation includes one or more of: a fade out of curves that do not change using an opacity change; an animation to thicken the target curves; a point animation that moves the target curve points from the starting location to an end location; an animation to make the target curves thin; and/or a fade in of all curves back to the original state before the change occurred.

Among other things, the present approach aids the readability of response graphs, improves the education of the listener as to the behavior of target and responses when certain variables are changed, and engage the end user in the specific operation that put the response and targets in a new state.

Aids to Viewing and Comparing Binaural Response Graphs

In current fitting systems if a user wishes to compare the hearing aid response between right and left sides in a binaural fitting the user has to scan back and forth between 2 graphs.

In scenarios where the response is complex, or where the audiogram differs greatly between the right and left sides, the right-left or left-right scanning can consume time and lead to inaccurate fittings.

Due to logarithmic nature of response graphs, it is difficult to scan for per side differences at the higher frequencies.

Figure 2:
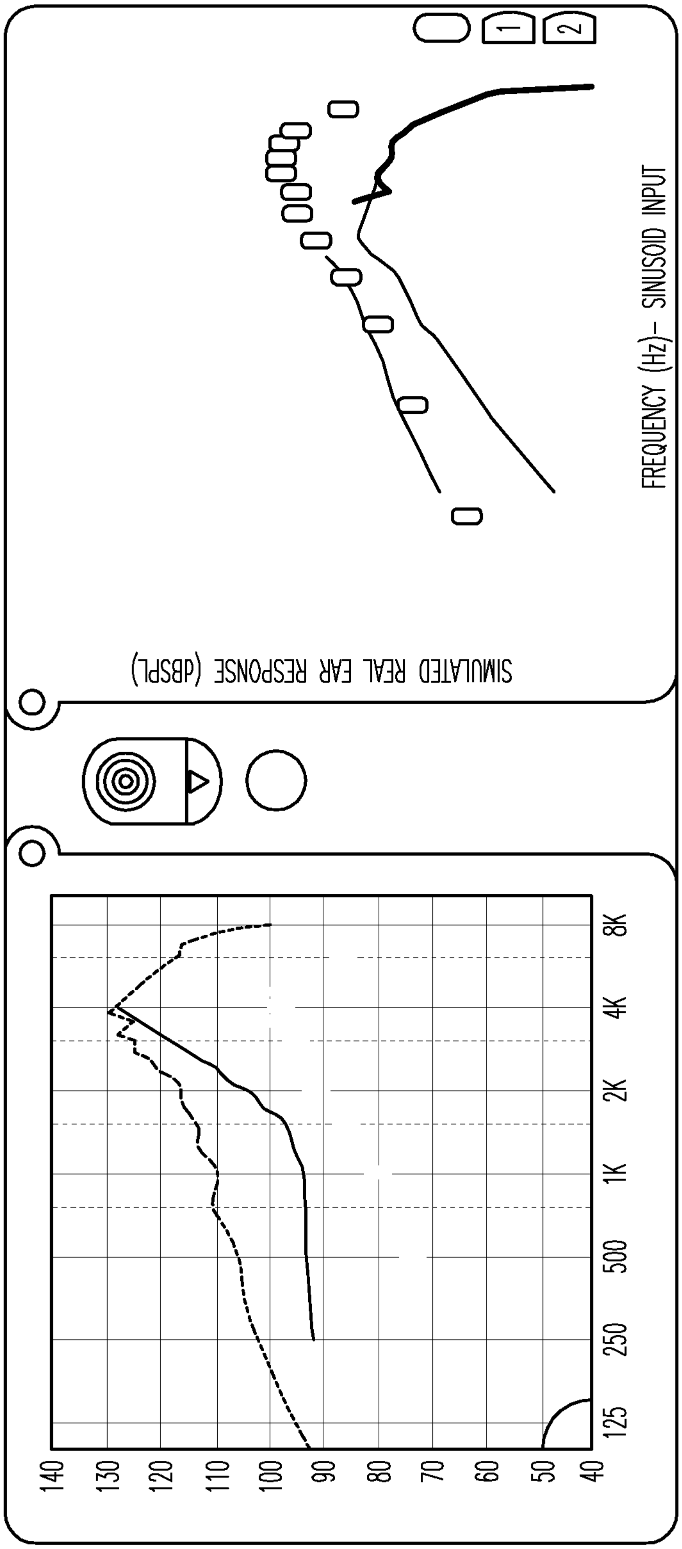
FIGS. 2-3 are example response graph, according to an example embodiment.

The response difference in FIG. 2 is difficult to see, but exists at about 5 KHz on the right side. The average input response is 2 dB higher on the right side at about 5 KHz. This is a very subtle difference that can have a big effect on the hearing experience of the device wearer. Current fitting systems lack a comprehensive visual reporting of differences between right and left sides. The present subject matter makes it easier for the comparison of binaural response using visual and evidence based techniques.

In one embodiment, a written report is made including a comprehensive list of all adjustments and instrument settings which are different between right and left, and how that difference impacts hearing aid response.

In a working visual embodiment, differences are seen in a channel frequency range. For example, in a response graph, a channel is a division along the frequency range that is a good baseline for visualizing response differences. Typically, the 4 differences that are of interest in the response include, but are not limited to, band, loud, soft, and max output. Each of these differences may be seen within the visual of a channel frequency range.

In some fitting systems, there is a graph legend popup window. In such systems, this popup window lists each curve being displayed on the graph in a list. In various embodiments, this list can be expanded with a column per channel on the right and left sides.

In various embodiments, within each column the user will see a blank circle indicating that the given adjustment is the same for both right and left in that channel, a right side icon indicating that the right side has a higher value for that curve in a specific channel, and/or a left side icon indicating that the left side has a higher value for that curve in a specific channel.

In various embodiments, the icon in the popup window is clickable, and can navigate the user directly to the adjustment screen and adjustment control that would allow the user to remedy any particular difference.

In various embodiments, for each graphical adjustment there is a grab handle. This grab handle sits at the channel center frequency. If a given adjustment performance is greater on one side then another, then the grab handle for that side can be filled with the corresponding side color (e.g., different shades or colors, like blue or red). The fill color of both sides are having an equal performance is a third color, such as black. In various embodiments, as an adjustment is changed, the color of the grab handle automatically updates to indicate greater or equal adjustment performance.

Figure 3:
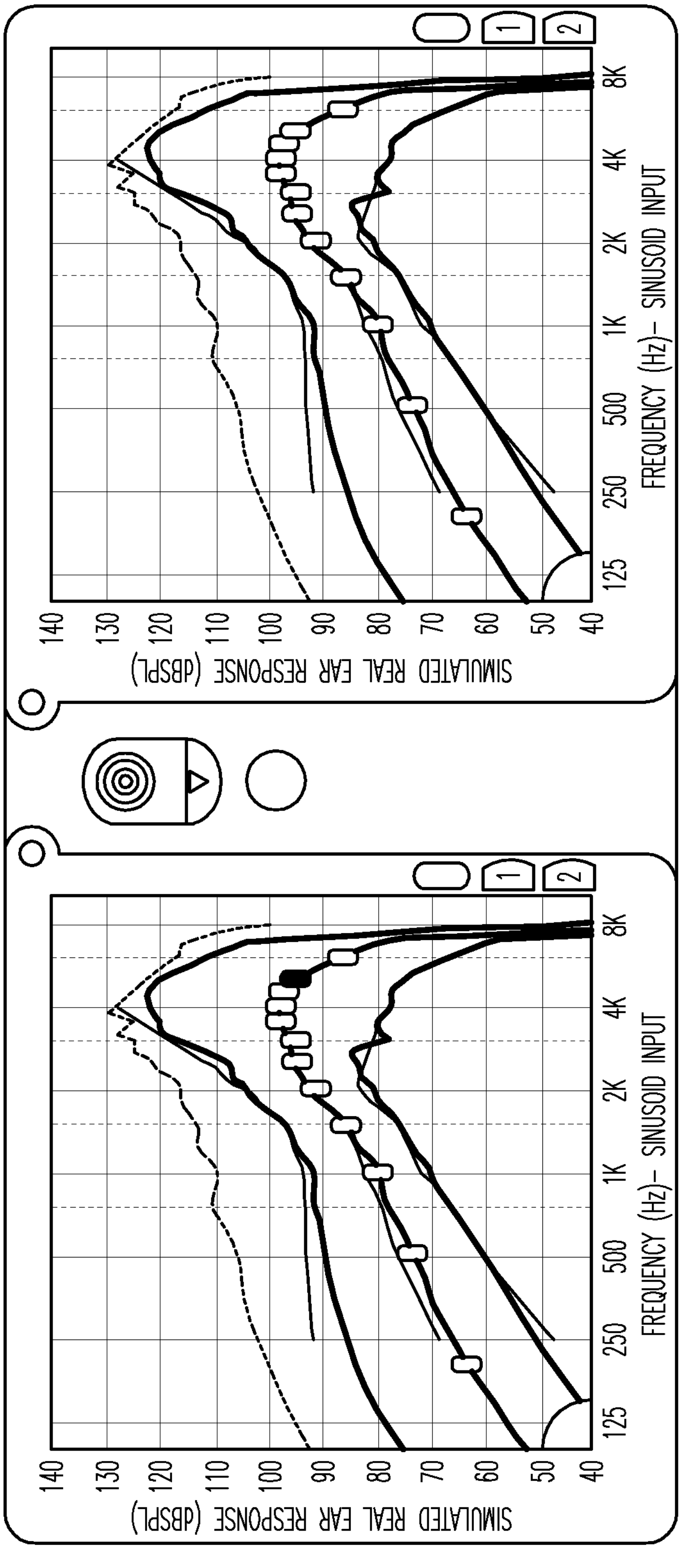

In FIG. 3 one can more readily see that the right hand average response curve at the 5 KHz point is greater due to the different color or shading.

Pins in Fitting User Interface

The present subject matter provides the use of "push pins" in relation to workflow and note taking within a fitting system. A push pin or pin is a marker on a display providing the aspects noted herein.

A user is enabled to put a pin in the map at locations that they want to remember. For example, the user placed pins are used as visual reminders, visual indicators, and a way to bring in additional user requested functionality such as using flags off of the pin.

Figure 4:
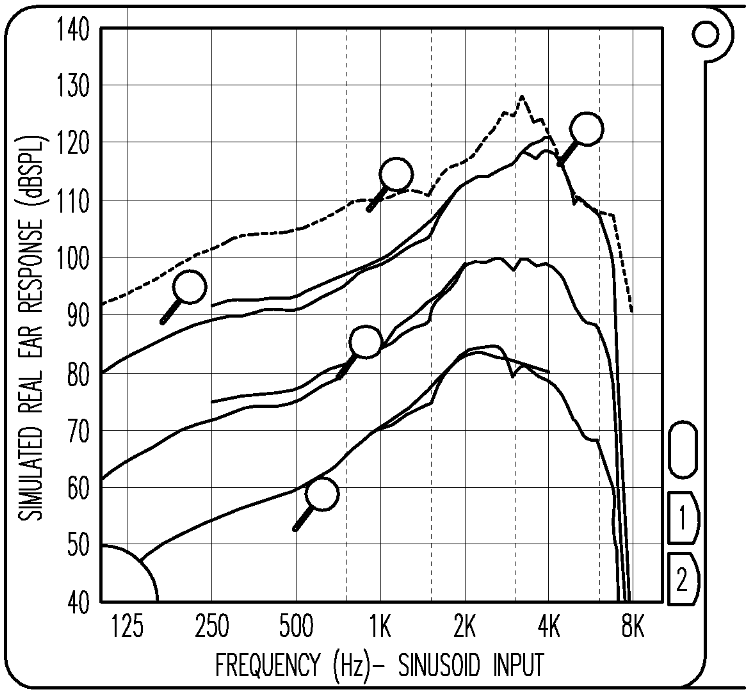
FIG. 4 is an example response graph with a visual indication of notes about the response graph, according to an example embodiment.

FIG. 4 shows a sample screenshot of graph with pins of a certain color (for example, the pins may be green pins).

One aspect of the use of pins is the ability to add and subtract animations from their functions to make them standout, or be removed from the UI (user interface) as needed.

In various embodiments, pins can serve as a focus of attention and action for many diverse fitting system functions.

In various embodiments, a central list of all placed pins can be accessed via a dialog or sidebar from the fitting system UI. Pins can be made visible or invisible via the central list. Data appended to a pin can be printed in a central list to serve as a session log. Pins and their values can be saved to a session so they can be recalled later. Pins can also be searched for within an entire client session. In such embodiments, if a pin is found via search, the session can be loaded, and the UI navigated and centered on the pin. An animation can be used to show a user the location of a chosen pin. In various embodiments, pin category view can be customized to only view certain pin types. In various embodiments, users can customize the color of the pin after placement. In various embodiments, pinned content can be shared or uploaded via an option. For example, if a user discovers a modeling abnormality, the user can pin the graph with a scientific pin and choose the "share this graph" option. A procedure could walk the user through a process including e-mailing an image of the graph, and/or initiating a session with an online assistance provider.

In various embodiments, a user can place a workflow pin anywhere in the entire fitting system UI. The location of the pin placement is used to derive the pin type and functions attached to the pin. In various embodiments, a note pin is available, for example, when the pin is placed on an area of the screen not related to adjustments (e.g., screen label, navigation bar, or button). The pin is placed, the date/time and context of the pin is recorded, and this pin appears in a list in the order of the pin placement. In various embodiments, a custom note can be appended to the pin. The note can be a flag off of the pin. The note can be turned off an on using a pointing device or can be programmed to appear when a pointing device is in proximity of the pin. In various embodiments, the note also appears in the central list of pins. The note pin can be used to remember the order in which someone performs certain operations (e.g., certain operations in order such as Quick Fit, Media Player, Surround Town, and Band Screen). The date/time and note fields will be able to be searched providing ways to recall notes and other events during the session.

In various embodiments, a user can place what is called a scientific pin in a graph. In various embodiments, this pin records the specific graph values on the X and Y axis as well as date/time, display mode, and even other modeling criteria (e.g., Acoustic Plumbing, Input Stimulus). In various embodiments, additional functionality includes, but is not limited to, the scientific pin serving as a guide post during adjustment (e.g., do not exceed 50 dB SPL gain at 500 Hz). In various embodiments, a scientific pin is also integrated into best fit and adjustments as a min/max point. Adjustments and best fit functionality can be programmed to not allow the response exceed or go below the pinned value. In various embodiments, a scientific pin is used on the audiometer graph to stop tone playback above or below thresholds.

In various embodiments, when a pin is placed on an adjustment control, the pin is called an "adjustment pin". This pin records the adjustment value at the location of the pin, as well as date/time and other notes. An adjustment pin can ensure that a certain adjustment never exceeds or goes below the pinned value for that adjustment.

In various embodiments, when a highlight pin is placed outside of the fitting UI (e.g., Data log, Hearing Loss Simulator, consulting tools) the log entry can be customized to highlight a value in a central list. For example, if a user visits the Mechanical Noise Data Log screen, the user can place a highlight pin on the pie chart indicating a 25% time spent in mechanical for all memories. The pin placement will be context sensitive and post an entry to the pin list that reads something like, for example: "Data Log-25% spent in Mechanical for all memories." The highlight pin enables fitting discoveries to be easily summarized via the pin placement list and to be included in a report.

Pins may be used to fix a bottom or a top of a setting. Pins could be used to depict warnings for the audiologist. Pins can also be used for finding exact value at a point.

Other approaches and pins and combinations of the foregoing approaches and pins are possible without departing from the scope of the present subject matter.

The present subject matter includes hearing assistance devices, including but not limited to, cochlear implant type hearing devices, hearing aids, such as behind-the-ear (BTE), in-the-ear (ITE), in-the-canal (ITC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal (RIC) of the user. It is understood that other hearing assistance devices not expressly stated herein may fall within the scope of the present subject matter.

It is understood that the various approached described herein can be implemented in software executing on a fitting system. Fitting systems can be implemented on a variety of processing devices including, but not limited to, personal computers such as desktop, laptop, notebook, and tablet computers, personal data assistants, cell phones, and other personal data devices. Some embodiments are provided in U.S. Pat. Nos. 6,424,722, 6,366,863 and related applications and patents, all of which are incorporated by reference in their entirety. Furthermore, it is understood that the approaches set forth herein may be employed in software, hardware, firmware, and combinations thereof. It is understood that the programming used to implement the steps provided herein can be stored on computer readable media that is distributed to provide functionalities and programmed apparatus to perform the approaches set forth herein. Variations in processors, computers, programming, and configurations may exist without departing from the scope of the present subject matter.

What is claimed is:

1. A method comprising:

calculating a response curve of a hearing assistance device, the response curve indicating sound level pressure level compared to frequency, displaying, on a display device, the response curve; and displaying concurrently with the response curve, a visual cue, wherein the visual cue includes an animation technique to dynamically illustrate changes in the response curve and to dynamically illustrate changes in a target curve when a fitting variable is changed during a fitting session of the hearing assistance device, and wherein the visual cue includes dynamic changes in color, shading and line thickness to assist a user in visualizing the response curve with respect to the target curve, and further displaying a grab handle for graphical adjustment, the grab handle including a fill color corresponding to a left or right hearing assistance device side with greater performance based on the change, the fill color automatically updated to indicate performance resulting from the change in the fitting variable.

2. The method of claim 1, wherein calculating a response curve of a hearing assistance device comprises:

calculating the response curve of at least one of 50 dB, 70 dB, or 90 dB sound level.

3. The method of claim 1, further comprising:

calculating a second response curve of the hearing assistance device; and displaying, on the display device, the second response curve concurrently with the response curve.

4. The method of claim 1, wherein displaying concurrently with the response curve, a visual cue comprises:

shading the response curve to indicate gain.

5. The method of claim 4, wherein coloring the response curve to indicate gain comprises:

fading out the response curve when gain is below 0 dB.

6. The method of claim 1, wherein displaying concurrently with the response curve, a visual cue comprises:

displaying the target response curve; and dynamically updating the target response curve and response curve in response to a variable change in a fitting formula.

7. The method of claim 6, wherein dynamically updating the target response curve and response curve in response to a variable change in a fitting formula comprises:

fading out portions of the response curve and target response curve where no change has occurred.

8. The method of claim 6, wherein dynamically updating the target response curve and response curve in response to a variable change in a fitting formula comprises:

a point animation that moves target curve points from a starting location to an end location.

9. The method of claim 1, wherein displaying concurrently with the response curve, a visual cue comprises:

displaying a second response curve, wherein the response curve is associated with anticipated response in a left ear, and the second response curve is associated with an anticipated response in a right ear; and visually indicating one or more differences between the response curve and second response curve, wherein the one or more differences are including at least one of: band, loud, soft, and max output.

10. The method of claim 9, wherein visually indicating one or more differences between the response curve and second response curve comprises:

coloring or shading the response curve or second response curve.

11. The method of claim 1, wherein the hearing assistance device is a hearing aid.

12. The method of claim 11, wherein the hearing aid is a behind-the-ear hearing aid.

13. The method of claim 11, wherein the hearing aid is an in-the-canal hearing aid.

14. The method of claim 11, wherein the hearing aid is an in-the-ear hearing aid.

15. The method of claim 11, wherein the hearing aid is a completely-in-the-canal hearing aid.

16. A method comprising:

calculating a response curve of a hearing assistance device, the response curve indicating sound level pressure level compared to frequency, displaying, on a display device, the response curve;

receiving a selection of a pin, wherein the pin is configured to be placed and customized by a user and is associated with data included in a central list of pins that serves as a fitting session log, wherein customizing the pin includes adding animation to the pin; and displaying, concurrently with the response curve, the pin, wherein the pin includes an option for a user to upload an image of a graph including the pin, and wherein location of the pin is used to derive pin type and functions available for the pin, including an order of operations for left and right hearing assistance devices available for the pin.

17. The method of claim 16, wherein displaying concurrently with the response curve, the pin comprises:

displaying a note pin, wherein the pin is selectable by a user to display contents of the note pin.

18. The method of claim 16, further comprising:

categorizing the pin; and dynamically showing or hiding the pin in response to a filter of a category.

19. The method of claim 16, further comprising:

generating an adjustment pin, wherein the adjustment pin specifies a range of the response curve.

20. A fitting system comprising:

a processor;

a display;

fitting software, which when executed on the processor, cause a response curve of a hearing assistance device and a visual cue to be displayed on the display, wherein the response curve indicates sound level pressure level compared to frequency, and wherein the visual cue includes an animation technique to dynamically illustrate changes in the response curve and to dynamically illustrate changes in a target curve when a fitting variable is changed during a fitting session of the hearing assistance device, and wherein the visual cue includes dynamic changes in color, shading and line thickness to assist a user in visualizing the response curve with respect to the target curve, and further displaying a grab handle for graphical adjustment, the grab handle including a fill color corresponding to a left or right hearing assistance device side with greater performance based on the change, the fill color automatically updated to indicate performance resulting from the change in the fitting variable.

* * * * *